United States Patent [19]

Brenner

[11] 4,413,019
[45] Nov. 1, 1983

[54] RADIATION CURABLE ADHESIVE COMPOSITIONS AND COMPOSITE STRUCTURES

[75] Inventor: Walter Brenner, Teaneck, N.J.

[73] Assignee: The Standard Products Company, Dearborn, Mich.

[21] Appl. No.: 326,904

[22] Filed: Dec. 2, 1981

Related U.S. Application Data

[62] Division of Ser. No. 45,863, Jun. 6, 1979, Pat. No. 4,319,942.

[51] Int. Cl.³ ................................................ B05D 3/06
[52] U.S. Cl. .................................... 427/36; 156/275.5; 156/275.7; 427/27; 427/44; 427/200; 428/90
[58] Field of Search ............... 427/44, 27, 36, 195, 427/206, 208.8, 200, 207.1, 208.4; 156/279, 272, 330, 331.2, 307.1, 329, 334, 307.3, 338, 307.7, 333, 275.5, 275.7; 428/90; 204/159.22, 159.23

[56] References Cited

U.S. PATENT DOCUMENTS

| | | | |
|---|---|---|---|
| 2,921,006 | 1/1960 | Schmitz et al. | 204/159.15 |
| 3,098,755 | 7/1963 | Barth et al. | 427/206 X |
| 3,188,229 | 6/1965 | Graham | 427/44 X |
| 3,279,424 | 10/1966 | Brown, Jr. et al. | 118/119 |
| 3,338,810 | 8/1967 | Warner | 204/159.18 |
| 3,361,842 | 1/1968 | Applegath et al. | 427/386 |
| 3,401,075 | 9/1968 | Jackson | 428/90 |
| 3,485,732 | 12/1969 | D'Alelio | 204/159.15 |
| 3,697,397 | 10/1972 | Kehr et al. | 204/159.14 |
| 3,869,341 | 3/1975 | Gotoda et al. | 204/159.12 X |
| 3,903,331 | 9/1975 | Klein | 427/206 |
| 3,924,021 | 12/1975 | Maruyama et al. | 427/35 |
| 3,933,566 | 1/1976 | Seiberling | 156/272 |
| 3,966,573 | 6/1976 | Bean | 204/159.23 |
| 3,988,227 | 10/1976 | Eldred | 204/159.17 |
| 4,039,722 | 8/1977 | Dickie et al. | 428/461 |
| 4,058,443 | 11/1977 | Murata et al. | 204/159.17 |
| 4,087,300 | 5/1978 | Adler | 156/307.1 X |
| 4,100,311 | 7/1978 | Nablo et al. | 156/272 X |
| 4,218,501 | 8/1980 | Kameya et al. | 428/90 |

*Primary Examiner*—Thurman K. Page
*Attorney, Agent, or Firm*—Harness, Dickey & Pierce

[57] ABSTRACT

This disclosure relates to novel adhesive compositions and composite structures utilizing the same, wherein said adhesive compositions contain an elastomer, a chemically compatible ethylenically unsaturated monomer, a tackifier, an adhesion promoter, and optionally, pigments, fillers, thickeners and flow control agents which are converted from the liquid to the solid state by exposure to high energy ionizing radiation such as electron beam. A particularly useful application for such adhesive compositions comprises the assembly of certain composite structures or laminates consisting of, for example, a fiber flocked rubber sheet and a metal base with the adhesive fulfilling the multiple functions of adhering the flocked fiber to the rubber sheet as well as adhering the rubber sheet to the metal base. Optionally, the rubber sheet itself may also be cured at the same time as the adhesive composition with all operations being carried out at ambient temperatures and in the presence of air, with exposure of said assembly to selected dosages of high energy ionizing radiation. These adhesive compositions contain no solvents thereby almost eliminating air pollution or solvent toxicity problems, and offer substantial savings in energy and labor as they are capable of curing in very short time periods without the use of external heat which might damage the substrate.

5 Claims, 3 Drawing Figures

RADIATION CURABLE ADHESIVE COMPOSITIONS AND COMPOSITE STRUCTURES

This is a division of application Ser. No. 045,863 filed June 6, 1979, now U.S. Pat. No. 4,319,942 issued Mar. 16, 1982.

BACKGROUND OF THE INVENTION

1. Field of the Invention

The present invention pertains primarily to radiation curable adhesive compositions and more particularly to high energy ionizing radiation curable adhesive compositions containing no solvents, and their employment for the fabrication of certain composite structures.

2. Description of the Prior Art

The state of the art is believed to be indicated by the following cited references: U.S. Pat. No. 4,039,722—Dickie et al; U.S. Pat. No. 3,933,566—Seiberling; U.S. Pat. No. 3,924,021—Maruyama et al; U.S. Pat. No. 3,869,341—Gotoda et al; U.S. Pat. No. 3,697,397—Kehr et al; U.S. Pat. No. 3,485,732—D'Alelio; U.S. Pat. No. 3,338,810—Warner; U.S. Pat. No. 3,188,229—Graham; and U.S. Pat. No. 2,921,006—Schmitz et al.

Basically, there are four main sources of radiant energy: gamma rays, high energy electrons, neutrons, and ultraviolet. Each of these sources has its respective advantages and disadvantages. The use of radiant energy to cure polymeric coatings or adhesives is of fairly recent origin, and it is only in the last several years that the two most commercially attractive sources, ultraviolet and electron beam, have been developed for use in industry. Because high energy radiation curing is a new technology, there are many shortcomings such as limited production experience, high initial costs, and lack of coatings and adhesives adapted for use with ultraviolet or electron beam systems. Examples of typical ultraviolet applications include printing inks and can coatings. These utilize polymeric materials such as acrylated polyethers, acrylated polyester-based polyurethanes, methacrylated polyesters and acrylated epoxies. With respect to electron beam, there are only a few operations currently in use in this country with one of the largest being Ford Motor Company's Saline, Mich. plant which uses an electron beam system to cure coatings on plastic parts, chiefly dashboards.

Although both ultraviolet and electron beam systems require a blanket of inert gas to eliminate the formation of harmful ozone gas, and have many other similarities, an electron beam system differs from an ultraviolet system in two main ways. First, an electron beam source delivers a higher degree of penetration than an ultraviolet source. While this makes possible the curing of coatings of significantly greater thicknesses, an electron beam source requires a substantial capital investment since equipment costs are high. An ultraviolet source, on the other hand, allows for less penetration, necessitating curing of only thin layers of coating, but equipment costs are substantially lower. Second, compositions for UV curing require the presence of a photosensitizer or photoinitiator, such as peroxide, benzoin or benzophenone. These initiators add an estimated 15% to the cost of ultraviolet coatings as compared to electron beam coatings. Such additives are not required with an electron beam system thus resulting in less formulation work and reduced compound costs.

Electron beam curing systems also offer distinct advantages over conventional heat or chemical processing. Electron beam machines currently commercially available offer simple control of penetration, dose, and line speed. The usually rather compact machinery furthermore allows for both uniform irradiation of a specific product as well as an integrated processing capability in the presence of air, inert gases, etc. Single, multi-sample, or continuous conveyor feeds are available.

The basic chemistry of high energy ionizing radiation curing adhesives or coatings involves free radical formation of certain reactive species due to the radiant energy applied. Radiation intensity is, of course, a factor of prime importance. Reaction rate is a function of variables other than radiation intensity such as temperature (the Arrhenius equation is applicable for correlating the temperature dependence of the rate constant); concentration; location of double bonds; steric hindrance; resonance and inductive effects on the reactivity of the double bond; the size and molecular weight of the monomer; and the viscosity of the medium.

A wide variety of resins and monomers have been investigated for the high energy ionizing radiation curing of adhesives and coatings. The systems of greatest interest are based on a variety of polymerizable prepolymers and monomers. Polyesters and acrylics are the most common, but urethanes, alkyds, epoxies and silicones have likewise been investigated, albeit to a lesser extent. Recently, a considerable research and development effort has been directed towards development of radiation curable acrylic polymer and/or monomer systems. Acrylic materials have been prepared, for example, by converting vinyl copolymers of various monomers and glycidyl methacrylate to radiation curable products by reacting the pendant oxirane group with acrylic acid. Acrylic derivatives have also been made based on modifying urethanes and epoxy resins, including, for example, reaction of appropriate polymeric moieties with acrylyl chloride. The order of reactivity to high energy ionizing radiation as determined by prior art research proposes that multifunctional acrylates are more reactive than the corresponding methacrylates. However, none of the prior art adhesives or coating systems appear to be fully satisfactory for the preparation of such fiber flocked rubber and metal composite structures as those described herein.

To be most useful in radiation curing, adhesive compositions should have minimum dose sensitivity. In simple terms, dose sensitivity means that both the total dosage and the rate of applied dosage affect the cure rate. The desired non-dose sensitive adhesive systems will provide the same cure results if the same radiation dosage is applied as ten exposures of one unit each, one exposure of ten units, or twenty exposures of a half unit each because a non-dose sensitive system is affected by the total dosage only and is not affected by the size of individual doses administered.

It is a principal object of the present invention therefore to provide a new radiation curable adhesive composition for fabrication of certain composite structures.

It is also an object of the present invention to provide a new high energy ionizing radiation curable adhesive composition which is not dose rate sensitive and is curable at low total dosages for lowest cost.

It is a further object of the present invention to provide a new radiation curable adhesive composition capable of being cured by exposure to high energy ionizing radiation at ambient temperatures and in the presence of air for the fabrication of laminates consisting of fiber flocked rubber sheets and a metal base.

It is another object of the present invention to provide a new radiation curable adhesive composition comprised of specified blends of elastomers, chemically compatible ethylenically unsaturated monomers, tackifiers, adhesion promoters and optionally, pigments, fillers, thickeners and flow control agents.

A still further object of the present invention is to provide a new high energy ionizing radiation curable adhesive composition containing no solvent thereby eliminating the need to remove the solvent from the composition as part of the curing process.

Other objects, features and advantages of the present invention will become apparent from the subsequent description, and examples, and the appended claims taken in conjunction with the accompanying drawings.

SUMMARY OF THE INVENTION

In accordance with the present invention, an adhesive composition is provided which is capable of being cured by high energy ionizing radiation and which comprises an elastomer, a chemically compatible ethylenically unsaturated polymerizable monomer or combination of monomers, a tackifier, an adhesion promoter, and optionally, pigments, fillers, thickeners and flow control agents. A particularly useful application for such adhesive compositions comprises the assembly of certain composite structures or laminates consisting of, for example, a fiber flocked rubber sheet and a metal base, with the adhesive fulfilling the multiple functions of adhering the flocked fiber to the rubber sheet as well as adhering the rubber sheet to the metal base. Optionally, the rubber sheet itself may also be cured at the same time as the adhesive composition with all operations being carried out at ambient temperatures and in the presence of air, with exposure of said assembly to selected dosages of high energy ionizing radiation.

BRIEF DESCRIPTION OF THE DRAWINGS

The foregoing objects and others will be pointed out more fully hereinafter in conjunction with the description of the preferred embodiment of the present invention illustrated in the accompanying drawings and examples and in which.

DESCRIPTION OF THE PREFERRED EMBODIMENT

Figure 1:
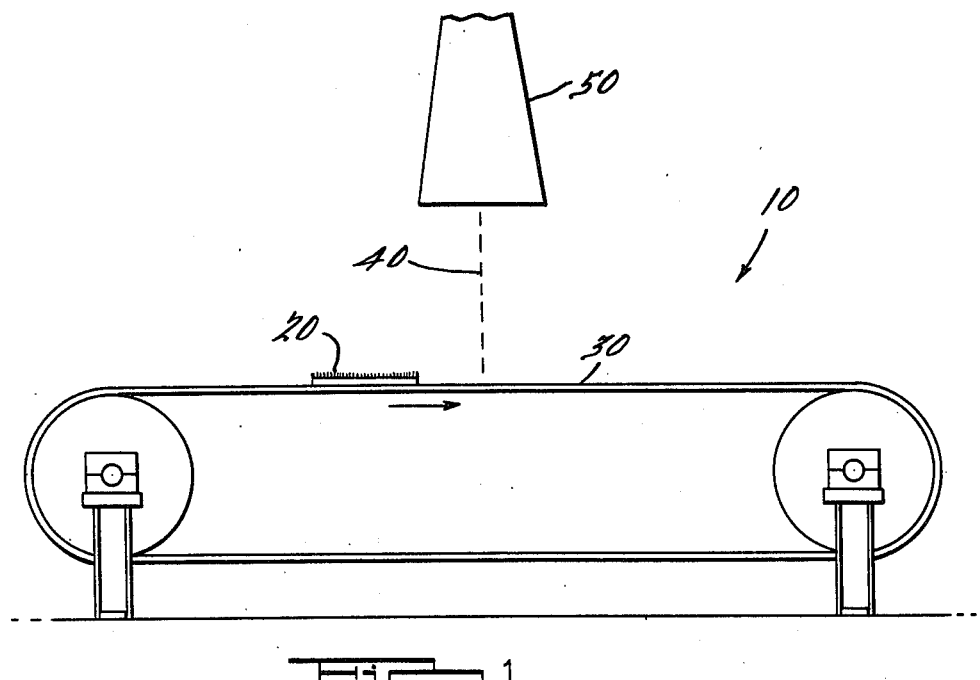
FIG. 1 is a cross-sectional view of an assembly line in which the adhesive composition of the present invention would be cured by high energy ionizing radiation such as an electron beam.

Referring now to the drawings wherein the showings are for the purpose of illustrating a preferred embodiment of the invention only and are not for the purpose of limiting the invention, FIG. 1 shows a cross-sectional view of an assembly line 10 in which a workpiece 20 moves along conveyor 30 through high energy ionizing radiation such as an electron beam 40. The electron beam 40 is produced by an electron beam emitting apparatus 50. The workpiece 20 would contain an electron beam curing adhesive made in accordance with the present invention which would be cured after passing through electron beam 40.

Figure 2:
FIG. 2 is a cross-sectional view of the adhesive composition of the present invention in use to adhere flock to a rubber substrate.

FIG. 2 is a cross-sectional view of a laminate assembled by using the present invention. The laminate shown is comprised of a rubber strip 60 of a thickness of about ⅛ inch, which is coated with about 2–5 mils of an adhesive composition 70 made in accordance with the present invention. Into the adhesive composition 70 is deposited flock 80. Any conventional method of flock deposition may be used, including electrostatic deposition.

Figure 3:
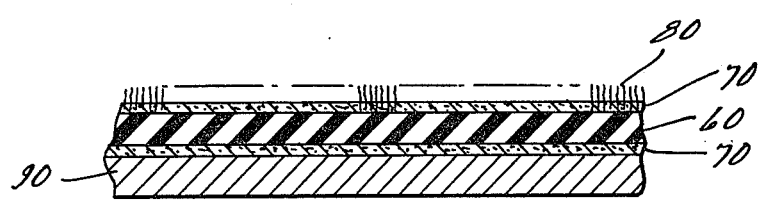
FIG. 3 is a cross-sectional view of the adhesive composition of the present invention in use to adhere flock to a rubber substrate, and to adhere the rubber substrate to a metal substrate.

FIG. 3 is a cross-sectional view of another laminate assembled by using the present invention. The laminate shown is in effect the laminate section described in FIG. 2 attached to a metal strip 90 with about 2–5 mils of the adhesive composition 70 of the present invention. Such a laminate is similar to that used in some types of automotive weatherstripping wherein metal strips coated with rubber and flock are used to seal out water, air or dust at such locations as the door to movable side window interface.

The adhesive composition of the present invention is comprised of two major components, an elastomer and a chemically compatible ethylenically unsaturated polymerizable monomer. The elastomeric base should be reactive with and be soluble in the monomer. Various elastomers possess the necessary characteristics. A representative sample of suitable elastomers includes natural rubber, acrylonitrile butadiene rubber, polybutadiene rubber, polyisoprene rubber, Phillips Petroleum 414C styrene-butadiene rubber, neoprene WRT (a polychloroprene elastomer manufactured by DuPont), B. F. Goodrich Chemical Co. Hycar 1001 (acrylonitrile butadiene type elastomer), PFA (a perfluoroalkoxy resin manufactured by DuPont), ethylene-chlorotrifluoromethane copolymer manufactured by Allied Chemical Co. and marketed under the Halar tradename, EA-/AN/VTS (a terpolymer of ethyl acrylate, acrylonitrile, and vinyltrioxy silane prepared by Biorksten Research Lab of Madison, Wisc.) Kel-F fluorocarbon elastomer made by 3M Co., Monsanto Chemical Co. N5400 (experimental acrylate), Thiokol Chemical Co. Thiokol ST polysulfide elastomers, and Dow Corning Corp. Silastic 250 organo-silicon polymer. Other suitable elastomers comparable or equivalent to those described may also be used.

The chemically compatible unsaturated polymerizable monomer or monomers are liquid monomers such as styrene monomer or methyl acrylate monomer. Suitable styrene monomers are commercially supplied by Monsanto and Dow Chemical. When a blend of acrylonitrile and butadiene rubber is used as the rubber base, an acrylate monomer such as ethyl acrylate, butyl acrylate, methyl methacrylate, ethyl methacrylate, or butyl methacrylate such as those supplied commercially by Rohm & Haas or DuPont may be used. Also, difunctional acrylic monomers and trifunctional monomers such as ethylene glycol dimethacrylate, and trimethylpropane trimethacrylate supplied by Sartomer Chemical Co. of West Chest, Pa. or Ware Chemical Co. of Fairfield, Conn. may be used. Other suitable monomers include vinyl toluene, diallylphthalate, triallylisocyanurate, triallylcyanurate, diallylmaleate, diallylsebacate, and vinyl pyrrolidone. Still other suitable monomers comparable or equivalent to those described above may also be used.

To improve the performance properties of the adhesive composition, various tackifiers and/or adhesion promoters may be added to the two major components described above. A tackifier resin such as Hercules, Inc. Piccolite LTP 135 or Piccotex (both modified resin derivatives), or Rohm & Haas Amberol may be used. Depending upon the type of substrates to be bonded together as well as the speed of curing desired, four different types of adhesion promoters may be used: one, variously substituted silanes including vinyl silanes such as Union Carbide Corp. A172 or A174 or aminosilanes such as Union Carbide Corp. A179; two, metal salts of selected long chain acids such as cobalt naphenate or cobalt octonate; three, methacrylic and/or acrylic acids and their esters; and four, hydroxyalkylacrylates and/or methacrylates such as hydroxypropyl methacrylate or hydroxyethylmethacrylate and/or hydroxypropylmethacrylate.

Other materials that may be added to the adhesive composition of the present invention include pigments such as conventional inorganic and/or organic pigments. Inorganic pigments including lead chromate, molybdenum, iron oxide, titanium oxide, zinc oxide, etc. and/or organic pigments including phthalocyanines, carbon black, quinacridones, perylene colors, anthraquinones, thioindigo reds, etc. are believed to be suitable. In addition, fillers such as any conventional inorganic mineral filler, e.g., silicas, aluminas, magnesia, titanium dioxide, molybdenic oxide, etc. may be used. Flow control agents or thickeners such as Cab-O-Sil finely divided silica made by Cabot Corp. or Santorel, also a finely divided silica, made by Monsanto may likewise be used.

With regard to curing a layer of rubber simultaneously with the adhesive composition of the present invention, any rubber capable of being cured with a sulfur or peroxide type recipe is believed to be satisfactory. This would preferably include rubbers with vinyl or alkyl unsaturation.

With regard to suitable sources of high energy ionizing radiation, it has been found that an electron beam accelerator such as a 1½ MEV Dynamitron or a 3 MEV Dynamitron made by Radiation Dynamics, Inc., of Plainview, Long Island, N.Y. are satisfactory. Other electron beam machines are made by High Voltage Engineering Co. or Energy Sciences Co., both of Massachusetts. Another possible source of high energy ionizing radiation is cobalt 60 isotope radiation.

Although the adhesive composition of the present invention as described above will perform satisfactorily, it has surprisingly been found that the following ranges may be used to obtain optimum performance.

| | Component | Broad Range (weight percent) | Preferred Range | Most Preferred Range |
|---|---|---|---|---|
| (a) | elastomer | 10 to 80 | 15 to 40 | 20 to 40 |
| (b) | monomer | 90 to 10 | 60 to 30 | 50 to 40 |
| (c) | tackifier | 2 to 20 | 5 to 15 | 8 to 12 |
| (d) | adhesion promoter | 0.2 to 10 | 3 to 6 | 4 to 5 |

EXAMPLE 1

An exemplary formulation of a preferred embodiment of the present invention which has been found to provide excellent performance properties is given below:

| Ingredient | Amount by Weight |
|---|---|
| Phillips 414C styrene-butadiene rubber base | 137.5 |
| Monsanto styrene monomer | 501.0 |
| Hercules, Inc. Piccolite LTP 135 tackifier | 70.0 |
| Union Carbide A 179 amino-silane mixture (10% silane, 90% styrene-monomer) | 9.9 |
| Rohm & Haas methacrylic acid | 7.3 |
| Witco Chemical cobalt naphthenate | 0.137 |

EXAMPLE 2

The following procedure was followed in an effort to evaluate the performance of the adhesive composition described in Example 1 of the present invention:

(1) Approximately 2 to 5 mils of the adhesive composition of Example 1 was applied to the top of a piece of plain steel.

(2) A piece of styrene-butadiene rubber, about ⅛ inch thick was then pressed onto the adhesive with finger pressure.

(3) Approximately 2 to 5 mils of the adhesive composition of Example 1 was applied to the top of the rubber.

(4) Polyester flock (3 denier×0.030 inch) was then applied to the adhesive using an electrostatic process of flock deposition.

(5) This laminate was then subjected to an electron beam dosage of about 15 mrads at Radiation Dynamics, Inc. in Plainview, Long Island, N.Y., using a 1.5 MEV Machine for this ⅛ inch thickness of rubber. (A 3.0 MEV Machine would be used for a ¼ inch thickness of rubber.)

(6) Several test specimens were returned to the laboratory to test the 180° peel adhesion strength of the flock to the rubber substrate. The integrity of this adhesive bond between the flock and the substrate affects the wear characteristics of the end products, and thus is used as a standard test to evaluate the performance of flock adhesives.

(7) The test specimens containing the electron beam cured adhesive of Example 1 exhibited 180° peel adhesion strength values of between about 10 to 15 pounds per inch (ppi), when pulled apart at 12 inches per minutes, with 6 ppi being the acceptable minimum value.

(8) Test specimens containing a typically used heat cured adhesive were tested as a control and were found to exhibit 180° peel adhesion strength values of between about 10 to 15 ppi. Adhesion strength values for a comparable heat cured peroxide adhesive system would be about 10 to 15% lower.

From the above test results it should be noted that the radiation cured adhesive composition of the present invention performed at least as well as a typically used heat cured adhesive composition. Due to the fact that the adhesive composition of the present invention also offers many advantages over prior art adhesives for such applications, it is believed that it will be very attractive to many manufacturers. Some of these advantages are described in the following paragraphs.

Although the preferred embodiment of the adhesive composition of the present invention as described in Examples 1 and 2, provides excellent adhesion to plain steel, it should be noted that similar performance can be expected on electrogalvanized or adhesive-primed steels. In addition, test results have shown that both nylon and cotton flocks can be used in a composite assembly similar to that described in Example 2, thereby increasing the versatility and adaptability of the present invention.

Due to the fact that the adhesive composition of the present invention is 100% solids with no solvents present, it presents several advantages. First, since the energy requirements of radiation curing units are substantially lower than those of the baking ovens used to evaporate solvents and promote thermal cures which they replace, there is reduced energy consumption. Second, since the adhesive is completely converted to a plastic-like film when cured, nothing is discharged into the atmosphere, thus resulting in a virtual elimination of air pollution. Third, with the adhesive composition being composed of 100% solids, and thus no flow-out of adhesive after application, there is less chance of toxicity. All of the above advantages are especially important today to all those industries affected by recent environmental and health legislation.

In addition to the advantages described above, the present invention also provides a rapid curing adhesive system in which cross-linking of the polymer adhesive occurs almost instantaneously, thus allowing for high line speeds. In addition, since radiation curing systems are extremely compact compared to conventional production baking ovens, there is an effective utilization of plant space. Also, since curing of the adhesive composition occurs at or near room temperature with accompanying energy savings, there is minimal substrate heating and thus the resulting ability to cure on temperature sensitive substrates without the fear of incinerating the substrate.

The adhesive compositions of the present invention have also been found to present the economic benefits of lower cost and greater price stability. Typically, a free radical initiator such as peroxide, benzoin or benezophenone presents significant additional material cost in proportion to its percentage in the adhesive formulation, is often subject to shortages, and usually presents storage stability problems. Since radiation beam curing processes do not require such an initiator, the above problems are avoided.

While it will be apparent that the preferred embodiment of the invention disclosed is well calculated to fulfill the objects above stated, it will be appreciated that the invention is susceptible to modification, variation, change, and substitution of equivalents without departing from the proper scope or fair meaning of the subjoined claims.

What is claimed is:

1. A method of curing an adhesive composition on a rubber substrate which comprises:
   providing a rubber substrate,
   coating said rubber substrate with a solvent-free adhesive composition comprised of an elastomer, an ethylenically unsaturated polymerizable monomer, a tackifier, and an adhesion promoter,
   depositing flock on the top side of the adhesive coated rubber substrate, and
   exposing the composite to high energy ionizing radiation to effect a cure of said adhesive.

2. The method of claim 1 wherein said rubber substrate comprises uncured rubber and wherein said uncured rubber is also cured when said adhesive-coated rubber substrate is exposed to high energy ionizing radiation.

3. The method of claim 2 wherein said uncured rubber comprises at least one material selected from the group consisting of sulfur and peroxide curable rubbers.

4. The method of claim 1 wherein said flock comprises at least one material selected from the group consisting of polyester, cotton, and nylon flock.

5. The method of claim 1 wherein said high energy ionizing radiation comprises at least one type of radiation selected from the group consisting of electron beam and cobalt 60 isotope radiation.

* * * * *